United States Patent [19]
Allen

[11] 3,909,204
[45] Sept. 30, 1975

[54] GAS POLLUTION MONITOR

[75] Inventor: John Douglas Allen, Surrey, England

[73] Assignee: British Gas Corporation, London, England

[22] Filed: Sept. 4, 1973

[21] Appl. No.: 393,958

[30] Foreign Application Priority Data
Sept. 21, 1972 United Kingdom............... 43823/72

[52] U.S. Cl. .......... 23/254 E; 23/232 E; 204/195 R
[51] Int. Cl. .......................................... G01n 27/30
[58] Field of Search........... 23/232 E, 254 E, 255 E; 73/26; 204/195 R

[56] References Cited
UNITED STATES PATENTS
3,589,868   6/1971   Hozumi........................... 23/254 E
3,764,269   10/1973   Oldham et al..................... 23/232 E Primary Examiner—R. E. Serwin
Attorney, Agent, or Firm—Larson, Taylor and Hinds

[57] ABSTRACT

Apparatus for monitoring low concentrations of nitrogen oxides and carbon monoxide in gas streams, in which carbon monoxide is determined by passing gas over iodine pentoxides to liberate quantative amounts of iodine vapour which are measured by means of a Pt-Act C or Ag/buffered halide cell associated with a galvanic cell, and nitrogen oxides are measured by passing gas through Pt-Act C or Ag/halide cells. Interfering gases are removed by known means prior to passage of gas through cell. NO concentrations may be determined in the presence of $NO_2$, thus $NO_2$ concentration may be determined by difference.

7 Claims, 3 Drawing Figures

GAS POLLUTION MONITOR

BACKGROUND

There is much concern these days about pollution of our environment. Two of the most obnoxious pollutants in the air are nitrogen dioxide and carbon monoxide, and the present invention relates to an apparatus for measuring the concentration of these compounds in the air.

SUMMARY

According to the invention, an apparatus for measuring low concentrations of nitrogen dioxide and carbon monoxide in a gas comprises means for providing two separate streams of the gas to be tested, means for removing interfering gases from a first of the two streams, means for reacting with the carbon monoxide in the first stream to produce iodine, a galvanic cell associated with each stream and comprising a platinum cathode in contact with a neutral buffered halide electrolyte in which is immersed an active carbon or silver anode, means for causing each stream to flow over the cathode of its associated cell, means for measuring the rate of flow of each stream through its associated cell, and means for measuring the current across its associated cell when each stream passes through it.

The type of galvanic cell used in this apparatus is known, and is responsive to the presence of nitrogen dioxide or halogens in a gas flowing over the cathode, the current produced by the cell being proportional to the concentration of the nitrogen dioxide or halogen in the gas and to the rate of flow of the gas. Thus, by measuring the current, and the rate of flow, the concentration of the relevant constituent can be calculated provided the efficiency of the cell has first been determined using a sample having a known concentration of the constituent. The concentration of the halogen measured in the first stream is proportional to the concentration of carbon monoxide which was initially present in that stream.

Unfortunately, the type of galvanic cell used is not specific to nitrogen dioxide and halogens, and the commoner other constituents to which it is responsive are sulphur dioxide and ozone. Both these constituents are readily removed from the first stream without affecting the carbon monoxide concentration. If it is thought that the gas to be monitored is likely to contain sulphur dioxide and ozone is appreciable quantities, then the apparatus should be provided with means for removing these constituents from the second stream before it passes through the cell monitoring $NO_2$. An alternative arrangement for avoiding these interferences is described below.

The apparatus in accordance with the invention provides a simple and very effective monitor which can be constructed relatively cheaply and also fairly compactly so that it can be made portable. Furthermore, the response time of the apparatus is small and we have found that it is 100% efficient when monitoring samples containing up to at least 10 vpm of nitrogen dioxide flowing at up to 50 mls per minute for the example of the galvanic cell described below, provided one assumes that the nitrogen dioxide reacts in the cell to produce nitrite irons (reaction $NO_2 + e^- \rightarrow NO_2^-$) rather than nitric oxide and water as has been assumed previously (reaction $NO_2 + 2H^+ + 2e^- \rightarrow NO + H_2O$). Our observations that the sensitivity of the cell is extremely stable and is also insensitive to temperature variations could be attributed to an absolute response to the nitrogen dioxide by the apparatus and would therefore back up our assumption concerning the cell reaction. Similarly it is not difficult to achieve quantitative conversion of CO to iodine which is detected with an efficiency of 100%.

DESCRIPTION OF PREFERRED EMBODIMENTS

Although the type of galvanic cell used in the present apparatus is not responsive to nitric oxide the apparatus may nevertheless be made to measure the concentration of nitric oxide in the gas sample by oxidising the nitric oxide to nitrogen dioxide before the sample passes through the cell. The apparatus therefore preferably has means for selectively causing the second stream, prior to passing through the associated cell, to flow either along a main path or along an alternative path which contains means for oxidising nitric oxide to nitrogen dioxide. The apparatus would then be operated first with the second stream passing along the main path to obtain a reading for the concentration of the nitrogen dioxide alone in the stream; then the apparatus would be operated with the second stream passing through the alternative path to obtain a reading which is equivalent to the sum of the nitric oxide and the nitrogen dioxide (NOx) in the stream; and then a subtraction of the first reading from the second reading would give an indication of the amount of nitric oxide in the sample.

The means for oxidising the nitric oxide may be a solution or moist solid bed containing either a permanganateor or dichromate. This type of oxidant has the advantage that is is also an efficient remover of sulphur dioxide, but they are sensitive to changes in humidity and can also retain some nitrogen dioxide, which is undesirable. Reasonably successful results for low nitric oxide concentrations (up to 10 vpm) have been obtained with an oxidant comprising an acidified solution of potassium permanganate or chromium trioxide dried onto quartz wool or silica gel. An acidified bed of manganese dioxide dried at 200°C also gives good results when conditioned with a humidified gas stream.

If the apparatus in accordance with the invention is arranged so that each stream passes through the same galvanic cell, the apparatus must also include means for ensuring that only one stream can pass through the cell at any time. However, if the concentrations of nitrogen dioxide and carbon monoxide are required to be measured substantially simultaneously, then clearly the apparatus must have two galvanic cells, one for each stream, and each having a separate current measuring circuit and a separate gas flow meter. The current measuring circuit may have a d.c. amplifier whose output may be calibrated in terms of $NO_2$ and CO concentration, and preferably the apparatus includes means for zeroing the or each measuring circuit in order to negate residual currents from the cell prior to a monitoring measurement being taken. This may be effected by providing means associated with the two streams for selectively removing the carbon monoxide and nitrogen dioxide from the first and second streams respectively. The current measuring circuits are zeroed when the gas streams are drawn through their respective cells having had the active constituents removed, after which the streams are switched so that the gases subsequently passing through the cells do contain the constituents to be measured.

BRIEF DESCRIPTION OF DRAWINGS

The gas flow system of an example of an apparatus in accordance with the present invention is illustrated diagrammatically in the accompanying drawings in which;

Referring to FIG. 1 the gas entering the system is divided into two streams, one for detecting and measuring the carbon monoxide in the gas and the other for detecting and monitoring either nitrogen dioxide or both nitric oxide and the nitrogen dioxide together.

Figure 1A:
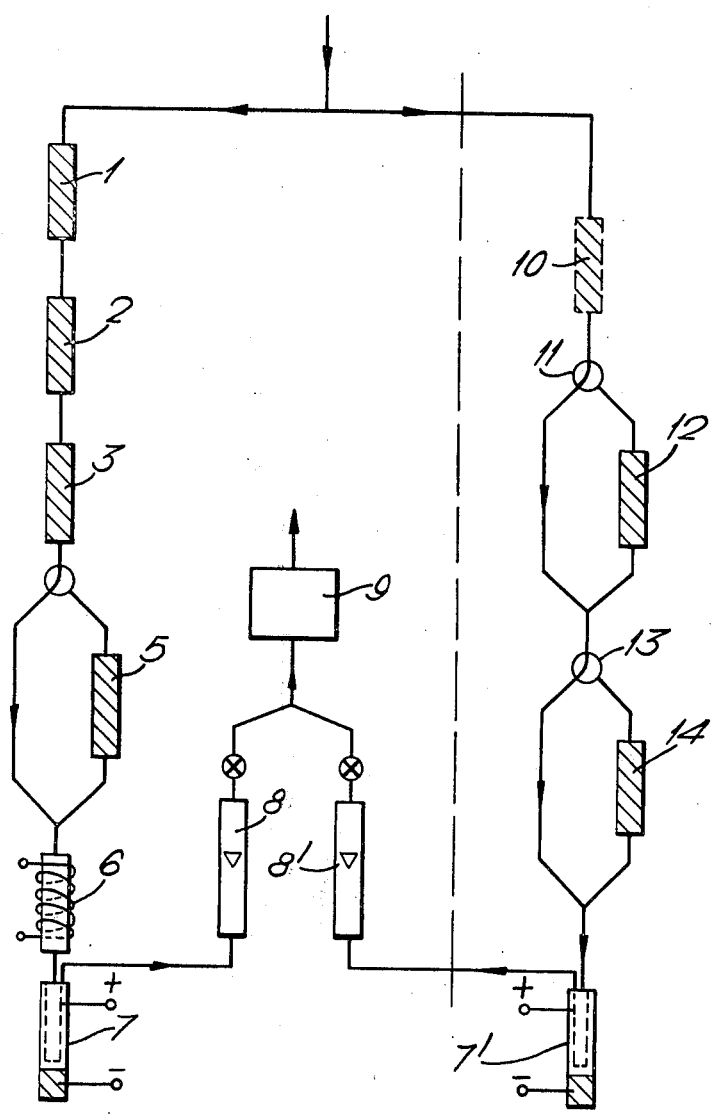
FIGS. 1a and 1b are flow diagrams illustrating the analysis train for CO and NOx.

The first stream passes through a purifying chain comprising a first absorber 1 containing acidified chromium trioxide absorbed onto silica gel, a second activated charcoal (which together absorb interfering gases such as NO, $NO_2$, $H_2S$, $C_2H_4$, $C_2H_2$, $SO_2$, $O_3$) and thirdly a dryer 3 containing a desiccant such as silica gel or anhydrous calcium sulphate. This is followed by a valve which can be operated to direct the gas along either one of two paths. The main one of these two paths selected when the apparatus is used for an actual measurement. The other path takes the gas through a bed of "Hopcalite" which oxidises and hence removes the carbon monoxide from the gas stream. This second path is the path selected when the apparatus is zeroed prior to a measurement. The paths rejoin each other before passing through a bed 6 of iodine pentoxide which is maintained at about 150°C by an electrical heating coil. This bed quantatively oxidises any carbon monoxide in the gas stream to carbon dioxide with the liberation of iodine vapour. The gas stream then passes through the galvanic cell which responds to the presence of the iodine vapour and the resultant current across the cell is amplified by a d.c. amplifier (not shown) and then measured and recorded.

From the cell the gas stream then passes through a flow meter 8 to measure the rate of flow of the gas stream before passing through a needle valve to the input of a diaphragm pump 9. This pump acts to draw the gas stream through the system, the needle valve acting to control the rate of flow.

The second stream first passes through a valve 11 which is operable to selectively direct the stream along a first or second path, the first path passing through a bed 12, containing soda lime or charcoal for example, for absorbing any nitrogen dioxide contained in the stream. The stream is directed along this path when the apparatus is zeroed as described above. The second stream, along which the gas under test passes, combines with the first stream and the combined stream leads to another valve 13 which is operable to direct the stream selectively along one of two further paths, a main path leading directly to the associated galvanic cell $7^1$, and the alternative path leading through a bed of material which oxidises any nitric oxide in the stream to nitrogen dioxide. This alternative path rejoins the main path prior to the galvanic cell $7^1$. In those cases where interfering gases are anticipated an additional selective scrubber 10 may be included at the beginning of the second stream, for example a specially prepared bed of silver peroxide according to that described in U.S. Pat. No. 3,677,708 may be used to selectively scrub ozone, sulphur dioxide, hydrogen sulphide and mercaptans from a gas stream containing nitrogen dioxide and nitric oxide.

Figure 1B:
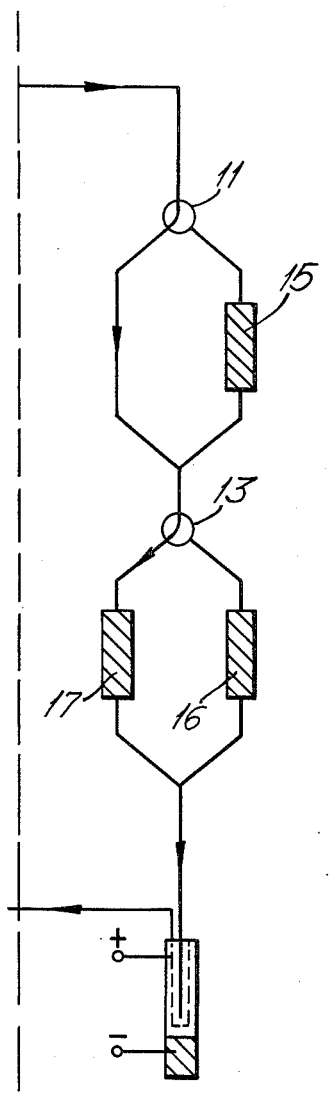

Alternatively, the second stream may be modified as shown in FIG. 1b to provide interference free monitoring of nitric oxide only or total oxides of nitrogen, giving the nitrogen dioxide concentration by difference. In this arrangement a valve 11 directs the sample either to a scrubber 15, consisting of triethanolamine dried coated onto an absorbent solid, which removes nitrogen dioxide but not nitric oxide, or by-passing this scrubber for NOx measurement. Both paths rejoin at the inlet to a second valve 13 which directs the sample either through a bed 17 of oxidant to oxidise NO to $NO_2$, or through an activated charcoal bed 16 which absorbs $NO_2$ for the purpose of zeroing the instrument. The alternative paths recombine before entering the galvanic cell $7^1$. In this way the monitoring of NO and NOx does not suffer from interference from $So_2$, $H_2S$ and mercaptans which are removed by the oxidant bed. In addition, if the oxidant is based on manganese dioxide or a permanganate, ozone will also be removed and cause no interference. If a chromium trioxide or dichromate oxidant is used, ozone interference can be avoided by the addition of a bed of ferrous sulphate crystals just prior to the oxidant bed. The ferrous sulphate destroys ozone and converts some or all nitrogen dioxide to nitric oxide but the latter is of no consequence since all nitric oxide is reoxidised to nitrogen dioxide by the following oxidant bed.

The cell $7^1$, and its current measuring circuit, is similar to that associated with the first stream, and the second stream after having passed through its cell passes through a gas flow meter $8^1$ and then a needle valve before passing into the same sampling pump 9 into which the first stream feeds.

The apparatus is operated in the manner described earlier. It should be emphasised that since the response of the apparatus to $NO_2$ and CO is predictable within certain limits, standard gas mixtures are required only to define the extent of these limits.

Figure 2:
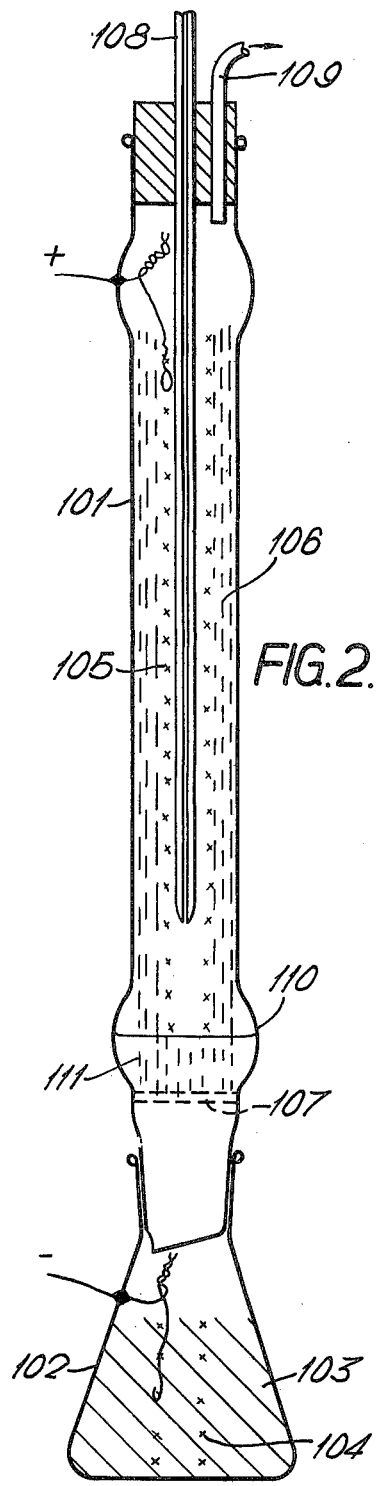
FIG. 2 is a sectional view of a cell suitable for use in the apparatus of this invention.

An example of the galvanic cell which may be used for each stream in the system just described is illustrated diagrammatically in FIG. 2 of the drawings. The cell comprises a cylindrical cathode compartment 101 connected to a conical anode compartment 102. The anode comprises a paste mass 103 of active carbon having embedded in it a platinum gauze member 104. An electrical connection leading from the gauze member extends in a sealed fashion through the wall of the conical flask. The cathode, which is formed by a cylindrical member of platinum gauze 105 is located coaxially within the upper compartment, and is surrounded by layers of glass fibre paper 106. This glass fibre packs the space between the cathode and the walls of the tube, and is separated from the carbon paste of the anode by a porous sintered glass disc 107. An electrical connection to the platinum gauze cathode extends in a sealed fashion through the wall of the cathode compartment. Also extending in a sealed fashion through the upper stopper are inlet 108 and outlet 109 tubes for the gas stream which is intended to flow over the cathode, the inlet projecting coaxially within the cylindrical cathode to near its lower end. The cathode compartment has a small bulb 110 at its lower end acting as an electrolyte reservoir. The cell contains a neutral halide buffered electrolyte 111, for example comprising 2.0 molar of potassium chloride, 0.1 molar of dipotassium hydrogen phosphate, 0.1 molar of potassium dihydrogen phosphate, 75% v/v of water, and 25% v/v of digol or glycerol which is present to reduce water evaporation during long periods of continuous operation. The electrolyte should be maintained at a level where the lower end of the glass fibre paper layers surrounding the platinum gauze cathode is immersed in the electrolyte, and when the electrolyte level drops it should be topped up with deionised water.

What we claim is:

1. Apparatus for measuring low concentrations of nitrogen oxides and carbon monoxide in a gas which apparatus includes means for receiving the gas to be treated, means for providing two separate streams of the gas to be tested, means for removing interfering gases from a first of the two streams, means for reacting the carbon monoxide present in the first stream with a iodine pentoxide compound to produce correspondingly quantitative amounts of iodine, a galvanic cell associated with each stream and comprising a platinum cathode in contact with a neutral buffered halide electrolyte in which is immersed an active carbon or silver anode, means for causing said iodine pentoxide containing first stream and said second stream to flow over the cathode of its associated cell, means for measuring the rate of flow of each stream through its associated cell and means for measuring the current from each cell when its associated stream passes through it.

2. Apparatus as claimed in claim 1 in which means are provided for supplying gas free from carbon monoxide for the purpose of zeroing the means for measuring the current across the associated galvanic cell.

3. Apparatus as claimed in claim 1 in which means are provided for supplying a gas free from nitrogen dioxide to the galvanic cell associated with the second stream for the purpose of zeroing the current measuring means associated with that cell.

4. Apparatus as claimed in claim 1 in which means are provided in said second stream for converting nitric oxide to nitrogen dioxide and means are provided for passing, at separate times, stream containing residual nitrogen dioxide and streams containing residual nitrogen dioxide and nitrogen dioxide formed from nitric oxide.

5. Apparatus as claimed in claim 4 in which said means for converting nitric oxide to nitrogen dioxide is a bed comprising a solution or moist solid of a permanganate or a dishromate.

6. Apparatus as claimed in claim 1 in which means are provided for the removal of interfering compounds.

7. Apparatus as claimed in claim 6 wherein beds of acidified chromium trioxide and activated charcoal are provided to remove nitric oxide nitrogen dioxide, acetylene, ethylene, sulphur dioxide, hydrogen sulphide, mercaptans and ozone from the carbon monoxide stream and a bed of silver peroxide is provided to remove ozone, sulphur dioxide, hydrogen sulphide and mercaptans from the nitrogen oxides stream.

* * * * *